US011611108B2

(12) United States Patent
Kim et al.

(10) Patent No.: US 11,611,108 B2
(45) Date of Patent: Mar. 21, 2023

(54) COMPOSITE ELECTRODE ASSEMBLY AND LITHIUM-ION SECONDARY BATTERY INCLUDING THE SAME

(71) Applicant: LiBEST INC., Daejeon (KR)

(72) Inventors: Joo Seong Kim, Daejeon (KR); Jin Hong Ha, Daejeon (KR); Kwang Seok Kim, Cheonan-si (KR); Gil Ju Lee, Daejeon (KR); Keum Bong Han, Gwangju (KR); Jae Sung Choi, Daejeon (KR); Joon Sik Chung, Daejeon (KR); Hyuk Sang Jo, Daejeon (KR)

(73) Assignee: LiBEST INC., Daejeon (KR)

( * ) Notice: Subject to any disclaimer, the term of this patent is extended or adjusted under 35 U.S.C. 154(b) by 377 days.

(21) Appl. No.: 16/694,179

(22) Filed: Nov. 25, 2019

(65) Prior Publication Data

US 2020/0235436 A1    Jul. 23, 2020

Related U.S. Application Data

(63) Continuation of application No. PCT/KR2017/011730, filed on Oct. 23, 2017.

(30) Foreign Application Priority Data

May 25, 2017    (KR) .................. 10-2017-0064641

(51) Int. Cl.
*H01M 10/0585*    (2010.01)
*H01M 10/0525*    (2010.01)
*H01M 50/46*    (2021.01)
*H01M 50/531*    (2021.01)

(52) U.S. Cl.
CPC ... *H01M 10/0585* (2013.01); *H01M 10/0525* (2013.01); *H01M 50/46* (2021.01); *H01M 50/531* (2021.01)

(58) Field of Classification Search
CPC ......... H01M 10/9585; H01M 10/0525; H01M 50/531; H01M 50/46
See application file for complete search history.

(56) References Cited

U.S. PATENT DOCUMENTS

2018/0026254 A1* 1/2018 Oh .................. H01M 10/0585
429/153

FOREIGN PATENT DOCUMENTS

| JP | 2015534251 A | 11/2015 |
|----|--------------|---------|
| KR | 100337707 B1 | 5/2002 |
| KR | 1020040082874 A | 9/2004 |
| KR | 1020140144870 A | 12/2014 |

(Continued)

OTHER PUBLICATIONS

International Search Report (English) issued in PCT/KR2017/011730, dated Feb. 23, 2018.

*Primary Examiner* — Jayne L Mershon
(74) *Attorney, Agent, or Firm* — Hamre, Schumann, Mueller & Larson, P.C.

(57) ABSTRACT

A flexible battery may include: a first electrode assembly including one or more unit cells, each having a pair of electrodes with a separator interposed therebetween; a single electrode; and a second electrode assembly connected to the first electrode assembly or to the single electrode and including a single electrode and a separator covering a top and bottom of the single electrode of the second electrode assembly.

11 Claims, 7 Drawing Sheets

(56) References Cited

FOREIGN PATENT DOCUMENTS

| KR | 1020150037155 A | 4/2015 |
| KR | 1020160031829 A | 3/2016 |

* cited by examiner

COMPOSITE ELECTRODE ASSEMBLY AND LITHIUM-ION SECONDARY BATTERY INCLUDING THE SAME

TECHNICAL FIELD

The present disclosure relates to a composite electrode assembly and a lithium-ion secondary battery that includes the electrode assembly.

BACKGROUND

A secondary battery refers to a battery that may be charged and discharged, as opposed to a primary battery that cannot be charged, and secondary batteries have been widely used in advanced electronic devices such as cellular phones, notebook computers, camcorders, and the like. As the portable electronic devices are manufactured to be made lighter, to have improved performance, and use thereof pertaining to the Internet of Things (IoT) advances, research continues regarding new and improved use of secondary batteries as power supplies for such devices.

Lithium secondary batteries have a higher voltage than nickel-cadmium batteries or nickel-hydrogen batteries, which are mainly used as power supplies for portable electronic devices, and lithium secondary batteries also have a high energy density per unit weight. Therefore, demand for lithium secondary batteries is increasing.

A secondary battery typically utilizes an electrochemical reaction that occurs between an electrolyte, a positive electrode, and a negative electrode when the positive electrode and the negative electrode are connected to each other when inserted into the electrolyte. Unlike conventional primary batteries, a secondary battery may be recharged and used again when the energy stored therein has been partially or fully consumed by use by an electronic device. Therefore, the use of rechargeable secondary batteries has increased with the popularization of wireless electronic devices.

Typically, a lithium secondary battery includes a jelly-roll type electrode assembly in which a separator is inserted between a positive electrode plate and a negative electrode plate, and is then spirally wound together; or, alternately, includes a flexible stacked type electrode assembly in which multiple positive electrode plates and negative electrode plates are stacked with a separator interposed therebetween.

Thus, if an electrode assembly in which a positive electrode plate, a separator, and a negative electrode plate are sequentially stacked has an external force applied thereto, such as bending, the stacked electrode plates may be damaged in whole or in part, rendering it difficult for current to pass, which is the basic function of the electrode assembly. Further, in such instance, the electrode assembly decreases sharply in capacity and, likely, function as a battery.

According to manufacturing processes of a conventional flexible battery, a strengthening tab may be provided on an electrode tab or an electrode lead may be bent to facilitate the flexibility of the battery. Otherwise, electrode plates provided with a parallel connection tab as well as an electrode lead connection tab are of different sizes than each other and are subjected to bonding followed by insertion and alignment. Therefore, the manufacturing processes become complicated and inefficient in terms of time, leading to the occurrence of defects.

DETAILED DESCRIPTION

Figure 1:
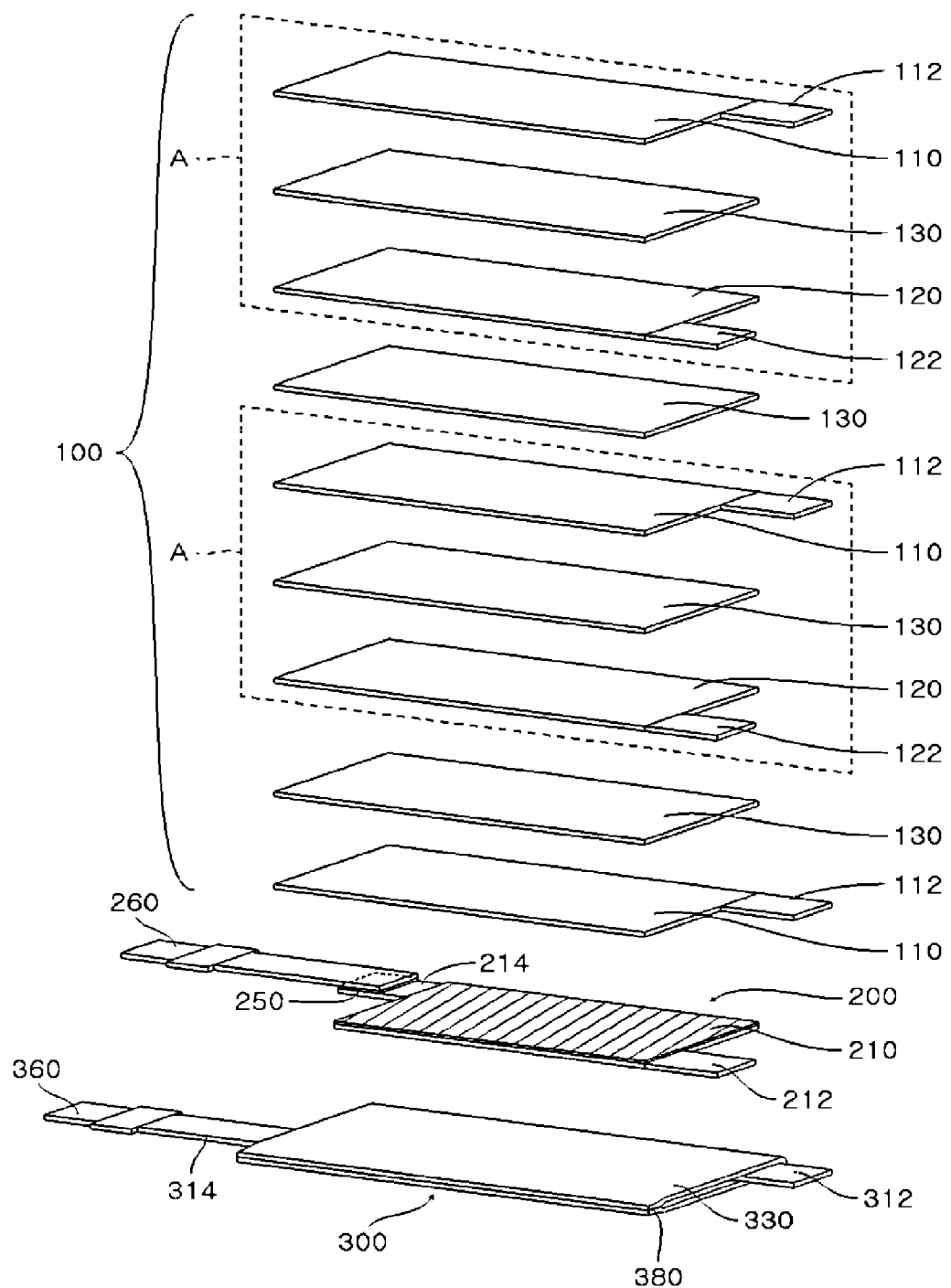
FIG. 1 is an illustration of a stacked structure of a composite electrode assembly, according to an example embodiment of the present disclosure.

The embodiments disclosed and recited in the present disclosure provide, e.g., a flexible battery for flexible devices, and improve processes for producing an electrode assembly for such flexible batteries. That is, the apparatuses, devices, system, methods, and programs disclosed, recited, and even suggested herein pertain to, at least, a composite electrode assembly and a method of manufacturing the electrode assembly by sequentially stacking multiple electrode assemblies and electrode plates having respectively different structures. Thus, the electrode assembly, which functions as a zigzag electrode assembly, may be assembled more simply and efficiently.

To solve problems referenced herein, a composite electrode assembly according to at least one example embodiment disclosed, recited, or suggested herein includes: a first electrode assembly including one or more unit cells, each having a pair of electrodes with a separator interposed therebetween; a single electrode; and a second electrode assembly connected to the first electrode assembly or to the single electrode and including a single electrode and a separator covering a top and bottom of the single electrode of the second electrode assembly.

The composite electrode assembly also includes electrode parallel connection tabs that are respectively formed on the first and second electrode assemblies and the single electrode, connecting the same polarity.

The composite electrode assembly also includes a separator that covers an outer surface of a structure in which the first electrode assembly, the single electrode, and the second electrode assembly are stacked, is taped partially.

The first electrode assembly and the second electrode assembly have the single electrode interposed therebetween.

The second electrode assembly is formed into a pocket by disposing the single electrode inside of the separator and performing adhesion of the top and bottom or performing welding depending on the design of a horn and an anvil.

An electrode lead connection tab to which an electrode lead is connected is formed only on the single electrode or the second electrode assembly among the first electrode assembly, the single electrode, and the second electrode assembly. Or, the electrode lead connection tab is not formed on the first electrode assembly.

The single electrode or the second electrode assembly includes an electrode lead connection tab and an electrode lead connected on the electrode lead connection tab, the electrode lead bent in a direction toward the outside from a direction towards the inside of the single electrode plate or the second electrode assembly.

The single electrode or the second electrode assembly includes an electrode lead connection tab, a strengthening tab fixed on the electrode lead connection tab, and an electrode lead joined to the strengthening tab.

The single electrode and the second electrode assembly are stacked in a state where an electrode lead is previously connected on the electrode lead connection tab.

A single separator is arranged among the first electrode assembly, the single electrode, and the second electrode assembly, thus suppressing a decrease in ion conductivity and providing flexibility.

In comparison with a single electrode assembly stacked in a zigzag manner, the composite electrode assembly disperses mechanical stress, and is taped partially, thus stabilizing a lithium-ion secondary battery when a corresponding device is bent and/or twisted.

The first electrode assembly is located between the single electrode and the second electrode assembly.

A composite electrode assembly according to at least one other embodiment of the present disclosure includes: a first electrode assembly having one or more unit cells, each having a pair of electrodes with a separator interposed therebetween; a single positive electrode; and a single negative electrode, with the single positive electrode and the single negative electrode having an electrode lead connection tab and a parallel connection tab, and with the electrode parallel connection tabs respectively formed on the first electrode assembly, the single positive electrode plate, and the single negative electrode plate, connecting the same polarity.

A lithium-ion secondary battery according to the present disclosure includes the above-described composite electrode assembly.

According to the embodiments disclosed, recited, and suggested herein, a single electrode assembly is manufactured by sequentially stacking multiple electrode assemblies and electrode plates having respectively different structures from each other. Thus, the electrode assembly can function as a zigzag electrode assembly, though manufactured in a simple and efficient manner.

Further, the electrode assembly is more flexible when compared to a conventional zigzag electrode assembly.

The description of a stacked structure of a composite electrode assembly according to the present disclosure is provided with reference to the accompanying drawings.

The example embodiments disclosed and recited herein are provided only for understanding of the present disclosure, but are not intended to limit the right scope of the present disclosure. Therefore, embodiments that perform the same functions in the same scope as those presently disclosed and recited are also included in the right scope of the present disclosure.

When reference numerals refer to components of each drawing, although the same components are illustrated in different drawings, the same components may be referred to by the same reference numerals, when possible. Further, if it is considered that description of related, known configuration or function may cloud the gist of the present disclosure, the description thereof may be omitted.

Further, in describing components of the example embodiments presently disclosed and recited, terms such as first, second, A, B, (a), (b), etc. may be used. These terms are used only to differentiate the components from other components. Therefore, the nature, order, sequence, etc. of the corresponding components are not limited by these terms. It is to be understood that when one element is referred to as being "connected to" or "coupled to" another element, it may be directly connected or coupled to another element or be connected or coupled to another element, having still another element "connected" or "coupled" therebetween.

Referring to FIG. 1 to FIG. 6, a stacked structure of a composite electrode assembly according to a first example embodiment of the present disclosure will be described.

Figure 2:
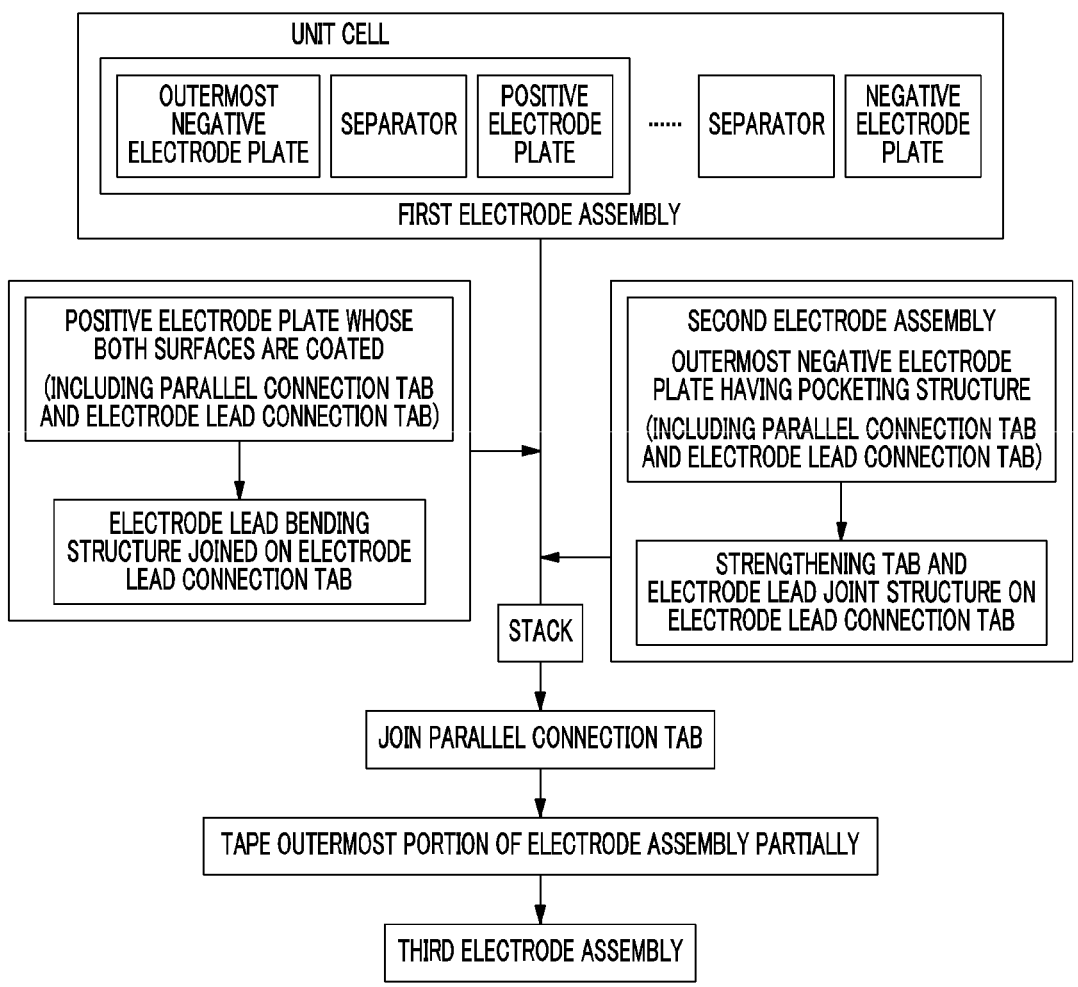
FIG. 2 illustrates a process of stacking a composite electrode assembly, according to an example embodiment of the present disclosure.

Firstly, referring to FIG. 1 and FIG. 2, a stacked structure of a composite electrode assembly will be described overall.

The composite electrode assembly includes a first electrode assembly 100; a single electrode plate 200 arranged on one side of the first electrode assembly 100, facing the first electrode assembly 100; and a second electrode assembly 300 located across from the first electrode assembly 100 with the single electrode plate 200 interposed therebetween.

The first electrode assembly 100 may include one or more unit cells A each having a pair of electrode plates 110 and 120 with a separator 130 interposed therebetween and electrode tabs 112 and 122 protruded without being coated with an electrode mixture.

Unit cell A of first electrode assembly 100 may include a negative electrode plate 110 and a positive electrode plate 120 with the separator 130 interposed therebetween.

For example, the first electrode assembly 100 may have a structure in which a first unit cell including an outermost single-surface negative electrode plate, a separator, and a positive electrode plate and multiple unit cells including a separator, a negative electrode plate, a separator, a positive electrode plate, a separator, a negative electrode plate, and the like are stacked in a zigzag manner.

In each unit cell, an electrolyte serving as an ion transport medium may be located between the negative electrode plate and the positive electrode plate, and the negative electrode plate and the positive electrode plate may include parallel connection tabs protruding therefrom.

The first electrode assembly 100 includes only the parallel connection tabs 112 and 122 on one side for alignment and stacking, whereas an electrode plate includes a parallel connection tab and an electrode lead connection tab on both sides within a conventional zigzag electrode assembly. Thus, the first electrode assembly 100 is not complicated but simple, and it can perform processes at a higher rate with a higher accuracy within the same time period, compared to the conventional one.

In the electrode plates, the top and/or bottom surfaces of each electrode plate serving as a current collector are coated with an electrode mixture, and parallel connection tabs 112 and 122 protrude therefrom. The parallel connection tabs 112 and 122 are exposed without being coated with the electrode mixture.

The multiple electrode plates having the same polarity are connected to each other through the parallel connection tabs 112 and 122. That is, multiple negative electrode plates 110 and multiple positive electrode plates 120 are electrically connected in parallel to each other by a tab-tab joint portion connecting electrode tabs.

In unit cell A, the separator 130 physically separates the electrode plates, but allows ions contained in the electrolyte to pass through.

In an example embodiment of the present disclosure, a negative electrode plate 110 located on the uppermost end of a first electrode assembly 100 is coated with a negative electrode mixture only on a single surface facing separator 130. However, a negative electrode plate 110 located on the lowermost end may be coated with a negative electrode mixture only on single surface facing towards separator 130, depending on the location where the first electrode assembly is stacked, which can also be included in an embodiment of the present disclosure.

In another example embodiment, the single electrode plate 200 is coated with a positive electrode active material on its top and bottom surfaces and may act as a positive electrode plate including a parallel connection tab 212 and an electrode lead connection tab 214. The single electrode plate 200 may be located between the first electrode assembly 100 and the second electrode assembly 300.

The second electrode assembly 300 has a thermal adhesion or ultrasonic welding pocketing structure in which a single outermost electrode plate 310 is covered with a separator 330.

The single outermost electrode plate 310 within the second electrode assembly 300 includes a parallel connection tab 312 and an electrode lead connection tab 314. A strengthening tab 350 and an electrode lead 360 may be joined on the electrode lead connection tab 314. The single outermost electrode plate 310 constituting the second electrode assembly 300 may be desirably a negative electrode plate.

When the first electrode assembly 100, the single electrode plate 200, and the second electrode assembly 300 are stacked, a sheet of a separator 130 is arranged on each layer. Thus, it is possible to suppress a decrease in ion conductivity and improve flexibility. That is, a decrease in bendability and a decrease in ion conductivity caused by an increase in thickness of separators can be suppressed.

In comparison with a conventional single electrode assembly stacked in a zigzag manner, the composite electrode assembly according to the present disclosure disperses mechanical stress, and is taped partially, thus enabling a flexible battery to be stable during bending and twisting operations.

The composite electrode assembly according to the present disclosure may have various stacked structures by differentiating the heights and the order of the first electrode assembly 100, the single electrode plate 200, and the second electrode assembly 300.

A method of joining electrode leads 260 and 360 on a tab-lead joint portion included in the single electrode plate 200 and the second electrode assembly 300 will be described.

According to the present disclosure, the electrode lead 260 or 360 is welded on the tab-lead joint portion in which a strengthening tab 250 or 350 is welded on the electrode lead connection tab 214 or 314 included in the single electrode plate 200 or the second electrode assembly 300, respectively.

That is, a separate strengthening tab is welded on the tab-lead joint portion, and then the electrode lead is joined to the strengthening tab. Thus, the electrode lead connection tab and the electrode lead are joined using the strengthening tab. The strengthening tab added on the tab-lead joint portion reinforces the strength of a joint portion between the electrode lead connection tab and the electrode lead and thus physically strengthens the joint portion.

On the top of an electrode lead connection tab extended from the single outermost electrode plate, a homogeneous or heterogeneous metal strengthening tab which is one to three times thicker than the electrode lead connection tab is added and welded. The added and welded strengthening tab and the electrode lead connection tab may have the same width or different widths.

According to the present disclosure, an electrode lead bending structure may be joined on the electrode lead connection tab 214 or 314 included in the single electrode plate 200 or the second electrode assembly 300, respectively.

When the electrode lead is placed in parallel to each other on the electrode lead connection tabs, a part of an end portion of electrode lead is welded on the top of each electrode lead connection tab. In this state, the electrode leads are bent 180 degrees. Thus, the electrode leads are bent from the electrode lead connection tabs toward the outside of the electrode assembly.

The method of joining the electrode leads on the electrode lead connection tabs by bending the electrode leads may be applied to at least one of a positive electrode tab and a negative electrode tab.

The single electrode plate 200 and the second electrode assembly 300 having the pocketing structure may be stacked in a state where the electrode leads are previously connected or welded on the electrode lead connection tab. In manufacturing processes of a conventional electrode assembly, electrode leads to be terminals are welded after an electrode assembly is stacked and wound entirely by a separator or a separator film.

However, in the present disclosure, the electrode leads are previously welded on the electrode lead connection tabs of the electrode plate and the electrode assembly to form a simply stacked composite structure. Thus, insertion and alignment processes are omitted so that the processing time can be reduced. Also, the occurrence of a welding failure and separation of the electrode leads during complicated manufacturing processes can be minimized. Thus, quality can be improved and cost reduction can be achieved.

Meanwhile, in a composite electrode assembly in which a first electrode assembly, a single electrode plate, and a second electrode assembly are sequentially stacked, a separator covering an outer surface of the composite electrode assembly may be taped partially with an adhesive tape.

Figure 3A:
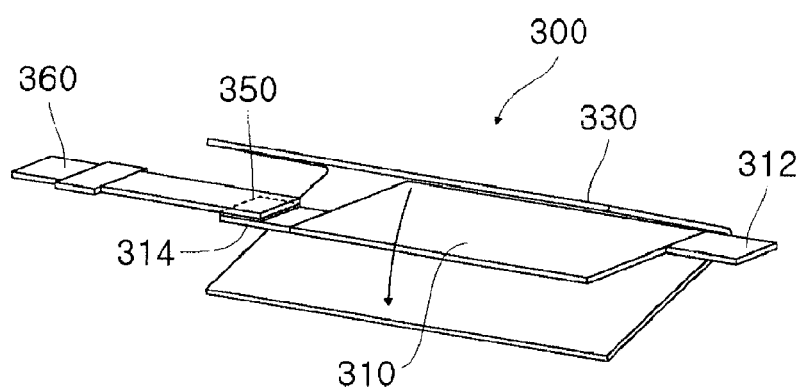
FIGS. 3A and 3B are illustrations of an outermost negative electrode plate in a pocketing structure constituting a composite electrode assembly, according to an example embodiment of the present disclosure.
Figure 3B:
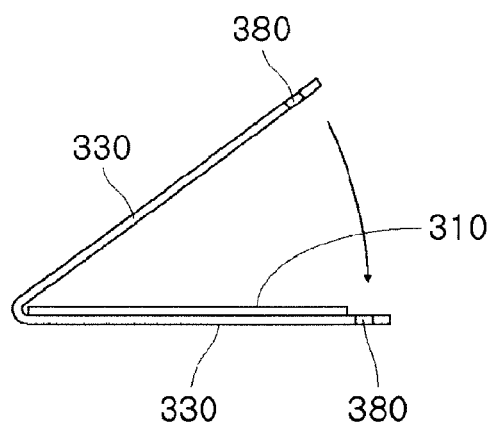

FIGS. 3A and 3B show that both sides of an outermost electrode plate are covered with a separator to form a pocketing structure. A pocketing process can be roughly divided into two processes: thermal adhesion; and ultrasonic welding.

Specifically, referring to FIGS. 3A and 3B, both sides of the separator 330 covering both sides of the single electrode plate 310 is manufactured into a pocket structure by thermal adhesion 380. During thermal adhesion, an electrode plate is inserted between the folded separator at a temperature of from 110° C. to 130° C., and a polymer film having excellent insulating properties and chemical resistance is used to thermally bond upper and lower outer edges of the separator.

As for ultrasonic welding, a separator is located on the top and bottom and an electrode plate is inserted therein. Then, a pocketing electrode assembly passing through over an anvil located on the bottom is ultrasonic welded by a horn located on the top. In this case, the horn may be formed into several small protrusions at predetermined locations to perform ultrasonic welding in the form of spots in predetermined sites. Otherwise, the horn may be a simple stepped horn or may be formed into a bar shape or a conical shape over the roller-type anvil. The horn may be used alone and may be replaced depending on the purpose of processing and the design.

Through this simple pocketing process, the electrode plate located within the separator is fixed, and even when the electrode assembly is deformed, such as repeatedly bent and twisted, it is possible to suppress a short circuit caused by misalignment and a decrease in capacity caused by separation. The outermost electrode plate may be damaged and cut by stress of external force. However, the separator on the both sides supports the electrode plate and also disperses the stress. Thus, it is possible to improve flexibility.

As described above, the composite electrode assembly according to the present disclosure has a composite structure in which the first electrode assembly, the single electrode plate, and the second electrode assembly are stacked.

Figure 4:
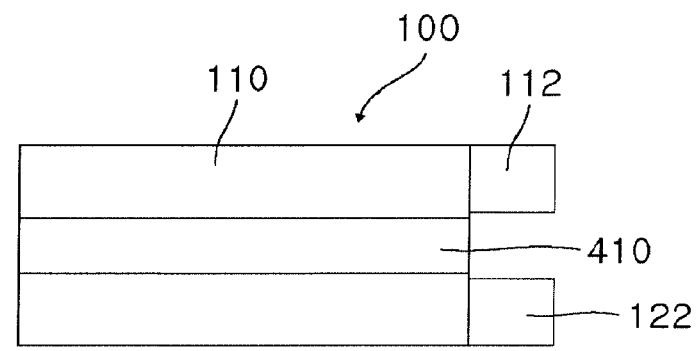
FIG. 4 shows the layout of a first electrode assembly, a positive electrode plate, and a second electrode assembly constituting a composite electrode assembly and stacked according to an embodiment of the present disclosure.
Figure 4:
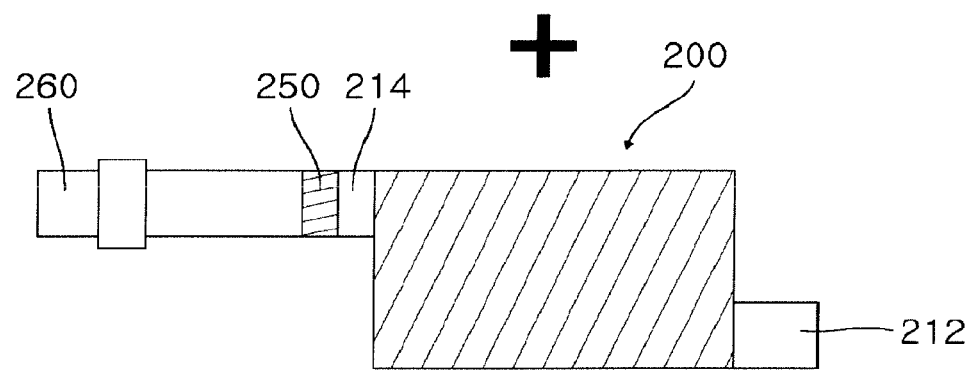
Figure 4:
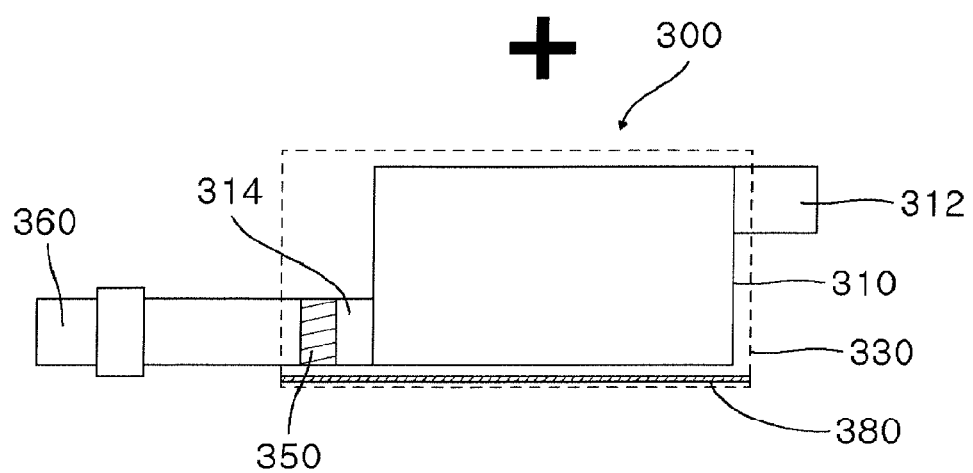

Referring to FIG. 4, the composite electrode assembly has a structure in which the electrode plates having the same polarity are electrically connected to each other and physically held by parallel connection tabs 112, 122, 212, and 312, from among the multiple electrode tabs formed on the first electrode assembly 100, the single electrode plate 200, and the second electrode assembly 300.

Multiple electrode parallel connection tabs protruding from the composite electrode assembly according to the present disclosure connect the electrode plates having the same polarity to be electrically parallel to each other. Further, tab-tab joint portions connected in parallel to each other are located on the separator covering the outer surface of the outermost electrode plate serving as the uppermost end or lowermost end of the electrode assembly and finished with a tape.

The parallel connection tabs are connected and fixed to each other and thus suppress misalignment and separation. Therefore, the parallel connection tabs enable partial taping rather than entire winding of the outermost portion of the electrode assembly with a separator, a separator film, or a finishing tape.

Figure 5:
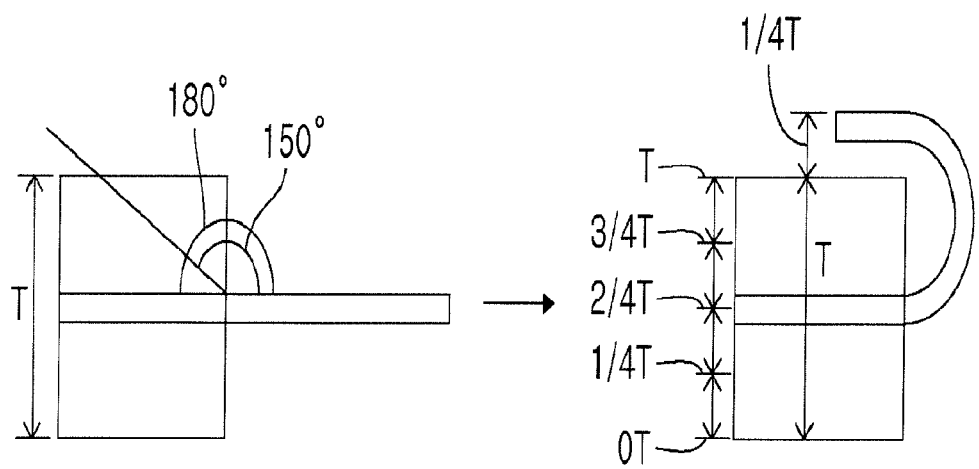
FIG. 5 shows a state in which electrode plates having the same polarity are physically and electrically connected to each other through parallel connection tabs among electrode tabs of a composite electrode assembly, according to at least one example embodiment of the disclosure.

FIG. 5 shows electrode plates having the same polarity being electrically connected and physically connected to each other through parallel connection tabs among electrode tabs. Herein, the tab-tab joint portions connected in parallel to each other are bent in curve and bonded to the top of the separator. In this case, the tab-tab joint portions may be bent desirably at an angle of 150° to 180°.

Further, if the thickness of the composite electrode assembly is T, the tab-tab joint portions are located in the range of bend radius of ¼ T to ¾ T and spaced apart from each other at a distance of less than ¼ T and bent on the top of the separator.

Figure 6:
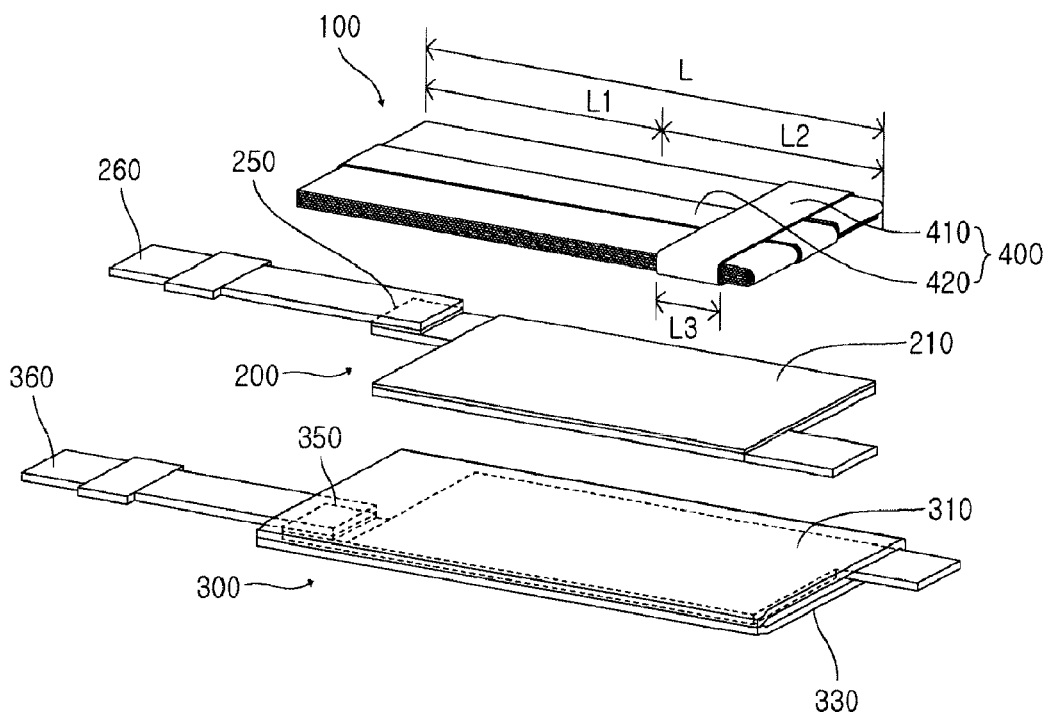
FIG. 6 is an illustration of an example embodiment of a composite electrode assembly that includes different electrode assemblies and electrode plates, according to an example embodiment of the disclosure.

FIG. 6 illustrates that the composite electrode assembly is taped partially. Since the composite electrode assembly is covered partially but not entirely, the thickness can be decreased and the flexibility to bending can be improved compared to the conventional one.

If the length of the electrode plate except the electrode tab protruded without being coated with an electrode mixture is L, L1 and L2 are in the ranges of 0<L1<½ L and ½ L<L2<2/2 L, respectively. Also, the finishing tape is located desirably in the range of L2, but may be located in the both ranges of L1 and L2 or divided into several small ones depending on the design of a battery. In this case, the width of the tape may be in the range of ¹⁄₁₀ L<L3<½ L. In a specific embodiment, a finishing tape 400 may include a first finishing tape 420 covering the first electrode assembly 100 along a longitudinal direction and a second finishing tape 410 located in the range of L2 of the first electrode assembly 100. The second finishing tape 410 may cover the entire composite electrode assembly.

Figure 7:
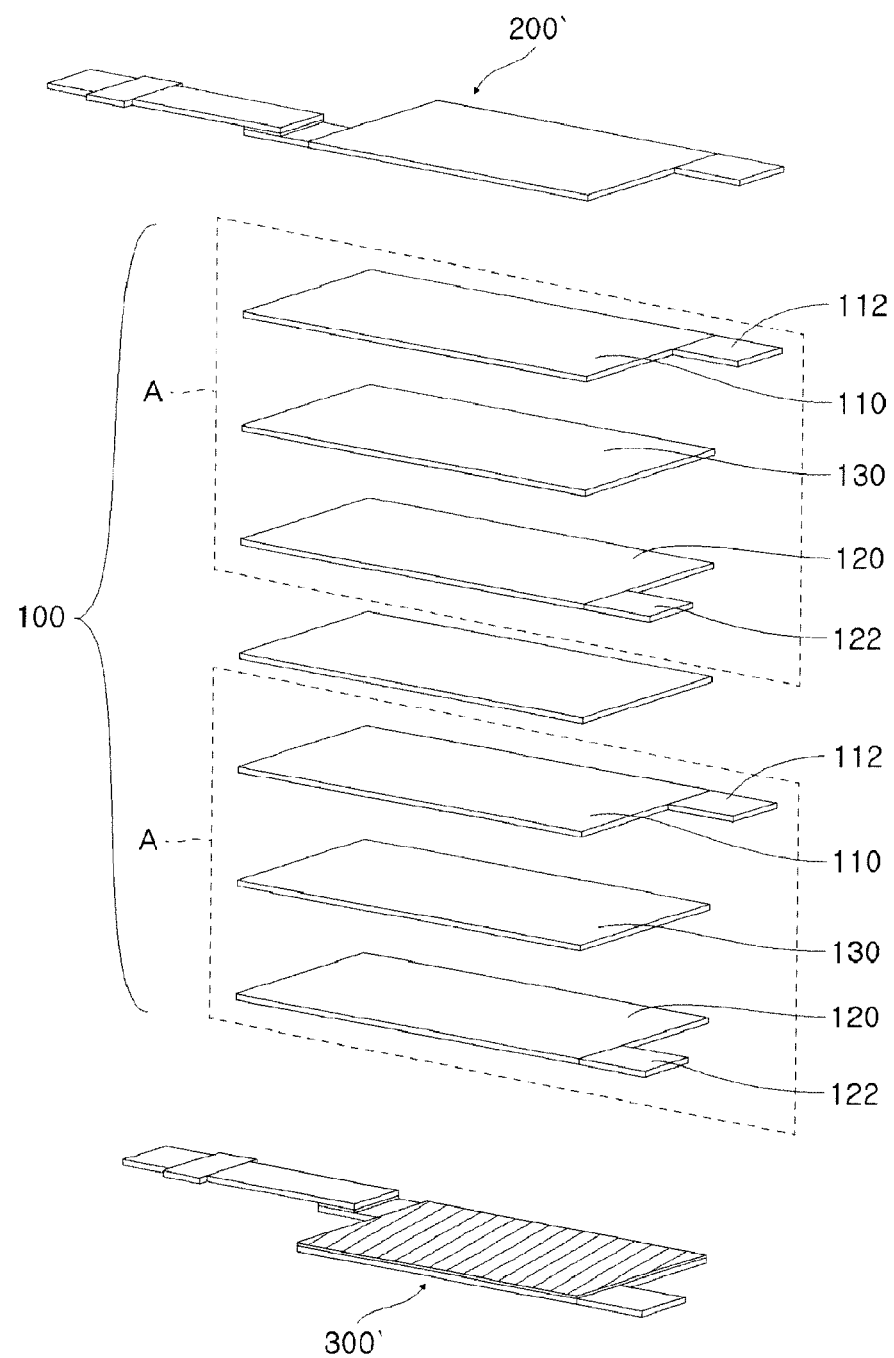
FIG. 7 shows a configuration of a composite electrode assembly in which a single positive electrode plate and a single negative electrode plate are stacked sequentially on both sides of a first electrode assembly, according to at least one other embodiment.

FIG. 7 illustrates a second embodiment the of the composite electrode assembly which is different from the above-described first embodiment in structure and processing. In the second embodiment, the composite electrode assembly includes the first electrode assembly including one or more unit cells each having a pair of electrode plates with a separator interposed therebetween, and a single positive electrode plate 200' and a single negative electrode plate 300' arranged on both sides of the first electrode assembly 100 and facing each other. The single positive electrode plate 200' and the single negative electrode plate 300' include an electrode lead connection tab as well as a parallel connection tab. Electrode parallel connection tabs respectively formed on the first electrode assembly 100 and the single electrode plates 200' and 300' connect the same polarity, and the single positive electrode plate 200', the first electrode assembly 100, and the single negative electrode plate 300' are stacked sequentially.

Herein, the single positive electrode plate 200' and the single negative electrode plate 300' are located on the both sides of the first electrode assembly without a pocketing process in a state where the electrode leads are previously welded on the electrode lead connection tabs and then electrically connected by the parallel connection tabs. Further, tab-tab joint portions connected in parallel with positive polarity are bent toward a single-surface positive electrode plate located on the lowermost end and tab-tab joint portions connected in parallel with negative polarity are bent over a single-surface negative electrode plate located on the uppermost end. Then, a taping process is performed.

Figure 8:
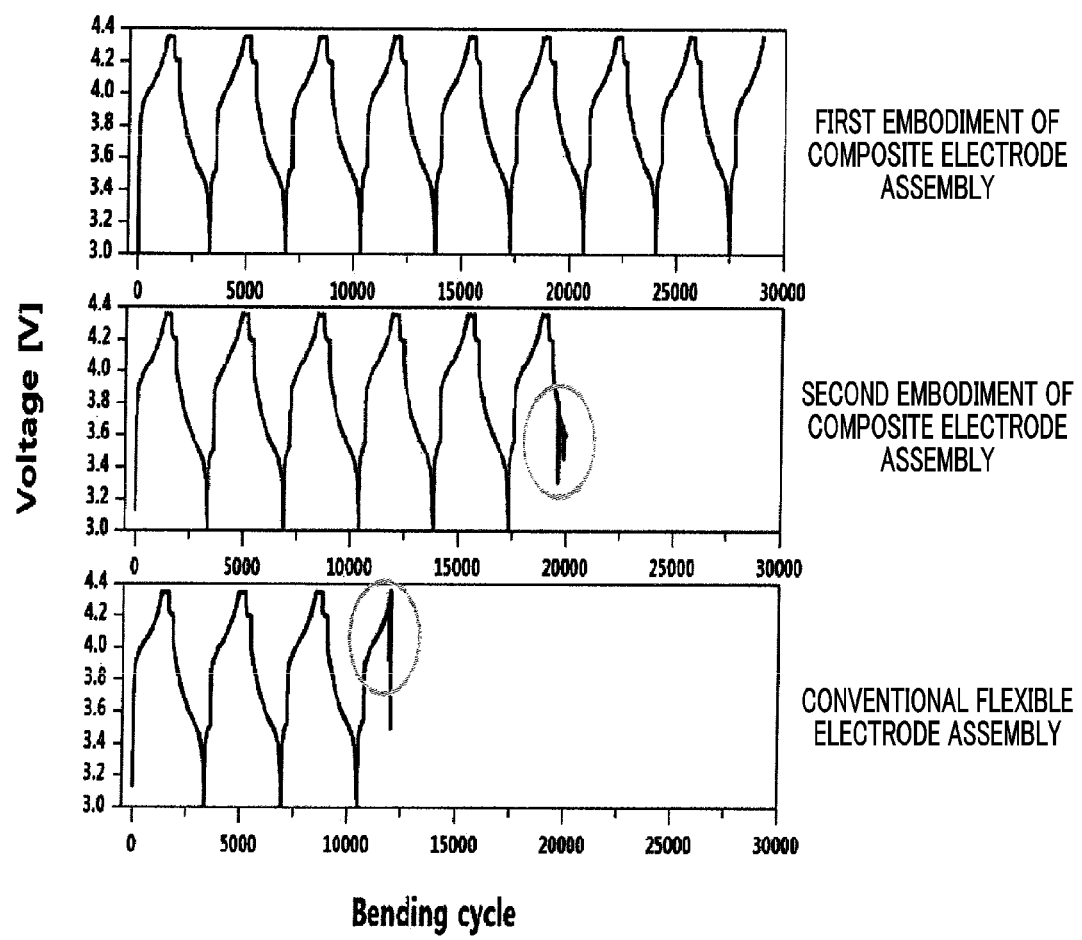
FIG. 8 shows the result of bending tests of a composite electrode assembly according to an embodiment of the present disclosure.

FIG. 8 shows the result of bending tests of a composite electrode assembly according to an embodiment of the present disclosure and a conventional flexible electrode assembly. A charge/discharge evaluation is performed while bending is performed at a bending angle of 35° to 85° and a rate of 25 rpm.

It can be seen that in the conventional flexible electrode assembly, noise is generated by bending when bending is performed more than 12,000 times and then, electrode plates located therein are damaged. Also, it can be seen that in the electrode assembly according to the second embodiment in which the single electrode plates are located on both sides of the first electrode assembly, noise is generated when bending is performed about 20,000 times. Therefore, it can be seen that the composite electrode assembly secures an improved flexibility compared to the conventional flexible electrode assembly.

Particularly, it can be seen that in the composite electrode assembly according to the first embodiment including the first electrode assembly, the single electrode plates, and the second electrode assembly having the pocketing structure, noise is not generated even after bending is performed more than 30,000 times and the electrode plates located therein are not damaged. Thus, it can be seen that under the same conditions, the composite electrode assembly according to the first embodiment has an excellent flexibility compared to the above-described electrode assemblies.

According to the present disclosure, a single electrode assembly is manufactured by sequentially stacking multiple electrode assemblies and electrode plates having different structures from each other. Thus, the electrode assembly has a similar function to a conventional zigzag electrode assembly and makes it possible to simply manufacturing processes and reduce processing time.

We claim:

1. A composite electrode assembly, comprising:
   a first electrode assembly including one or more unit cells, each having a pair of electrodes with a separator interposed therebetween;
   a single electrode; and
   a second electrode assembly connected to the first electrode assembly or to the single electrode and including a single electrode and a separator covering a top and bottom of the single electrode of the second electrode assembly,
   wherein electrode parallel connection tabs are respectively formed at a first end of each of the first electrode assembly, the second electrode assembly, and the single electrode, the electrode parallel connection tabs respectively connecting to the same polarity, and
   wherein at least one electrode lead connection tab is formed at a second end opposite to the first end of the single electrode or the second electrode assembly.

2. The composite electrode assembly of claim 1, further comprises a separator covering an outer surface of a structure in which the first electrode assembly, the single electrode, and the second electrode assembly are stacked, is taped partially.

3. The composite electrode assembly of claim 1, wherein the first electrode assembly and the second electrode assembly have the single electrode interposed therebetween.

4. The composite electrode assembly of claim 1,
   wherein the separator covering the top and the bottom of the single electrode of the second electrode assembly is formed as a pocketing structure, and
   wherein the single electrode is disposed inside of the pocketing structure of the separator and the top and the bottom of the single electrode are adhered or welded to the separator.

5. The composite electrode assembly of claim 1, wherein the single electrode or the second electrode assembly includes the electrode lead connection tab and an electrode lead connected on the electrode lead connection tab, the electrode lead bent in a direction toward an outside from a direction towards an inside of the single electrode or the second electrode assembly.

6. The composite electrode assembly of claim 1, wherein the single electrode or the second electrode assembly includes the electrode lead connection tab, a strengthening tab fixed on the electrode lead connection tab, and an electrode lead joined to the strengthening tab.

7. The composite electrode assembly of claim 1, wherein the single electrode and the second electrode assembly are stacked in a state where an electrode lead is previously connected on the electrode lead connection tab.

8. The composite electrode assembly of claim 1, wherein a single separator is arranged among the first electrode assembly, the single electrode, and the second electrode assembly, thus suppressing a decrease in ion conductivity and providing flexibility.

9. The composite electrode assembly of claim 1, wherein the electrode parallel connection tabs that respectively connect to the same polarity are connected in parallel.

10. A lithium-ion secondary battery, comprising:
    a composite electrode assembly of claim 1.

11. A composite electrode assembly, comprising:
    a first electrode assembly including one or more unit cells, each having a pair of electrodes with a separator interposed therebetween;
    a single positive electrode; and
    a single negative electrode,
    wherein the single positive electrode and the single negative electrode include an electrode lead connection tab and a parallel connection tab, and
    wherein electrode parallel connection tabs are respectively formed on a first end of the first electrode assembly, the single positive electrode, and the single negative electrode, the electrode parallel connection tabs respectively connecting to the same polarity,
    wherein at least one electrode lead connection tab is formed at a second end opposite to the first end of the single positive electrode or the second negative electrode.

* * * * *